No. 831,164. PATENTED SEPT. 18, 1906.
T. J. KING.
SCALE.
APPLICATION FILED DEC. 16, 1905.
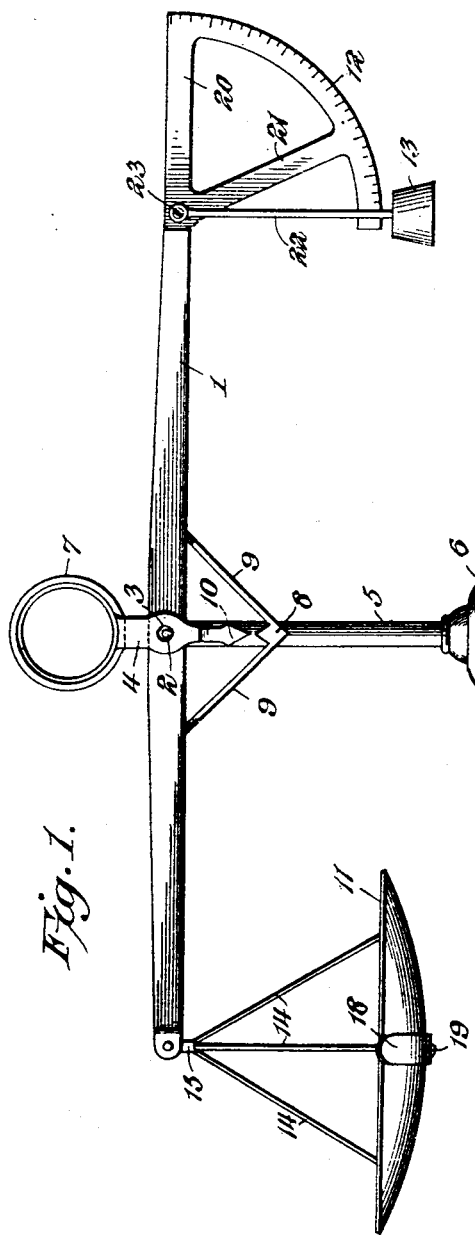
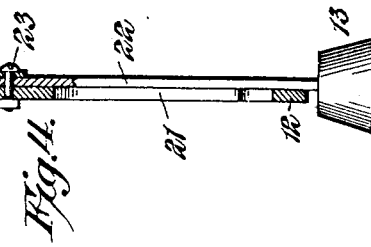
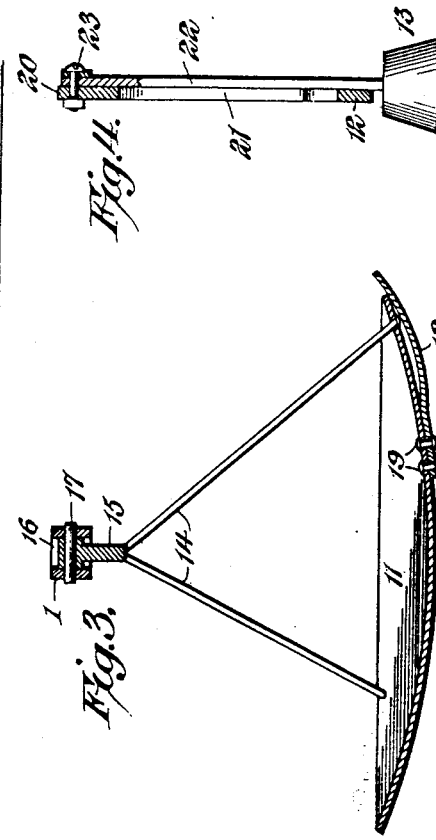
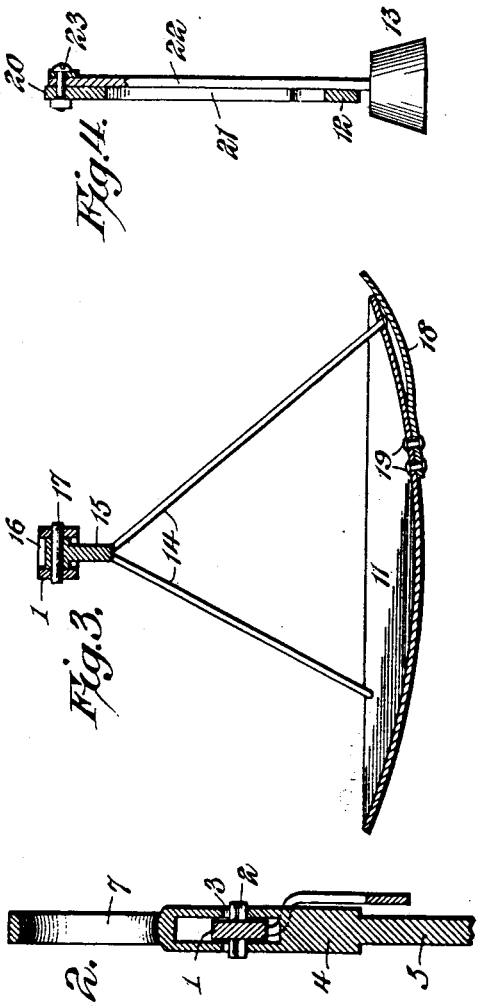
Thomas J. King, Inventor,
Witnesses
Howard W. Orr.
H. F. Riley
By E. G. Siggers
Attorney

UNITED STATES PATENT OFFICE.

THOMAS J. KING, OF RICHMOND, VIRGINIA.

SCALE.

No. 831,164.     Specification of Letters Patent.     Patented Sept. 18, 1906.

Application filed December 16, 1905. Serial No. 292,081.

*To all whom it may concern:*

Be it known that I, THOMAS J. KING, a citizen of the United States, residing at Richmond, in the county of Henrico and State of Virginia, have invented a new and useful Scale, of which the following is a specification.

The invention relates to improvements in scales.

The object of the present invention is to improve the construction of scales and to provide a simple, inexpensive, and efficient one adapted for weighing various articles and designed particularly for use on a desk for weighing letters, small packages, and the like for the mail.

A further object of the invention is to provide a scale of this character having means for firmly holding a letter while it is being weighed and capable of enabling the same to be readily placed on and removed from it.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a side elevation of a scale constructed in accordance with this invention. Fig. 2 is a central vertical sectional view of the upper portion of the scale. Fig. 3 is a sectional view illustrating the manner of mounting the scale-pan and the construction of the letter clamp or holder. Fig. 4 is a sectional view illustrating the manner of mounting the adjustable weight.

Like numerals of reference designate corresponding parts in all the figures of the drawings.

1 designates a scale-beam provided with knife-edged pivots 2, extending to opposite sides of the beam 1 and arranged in bearing openings 3 of a support 4 of a standard or post 5. The standard or post 5 is provided at its lower end with a suitable base 6, and it has a ring 7 at the top for enabling the scale to be readily supported by hand. The ring 7 will enable the scale to be suspended from a suitable support, and when the scale is mounted in this manner the base is not necessary. The beam is provided with a movable indicator 8, supported by downwardly-converging arms 9, which are connected to the indicator 8, and the latter consists of a tapering upwardly-extending substantially arrow-shaped head, which moves laterally of the standard or post and which lies beneath a fixed indicating-point 10 of the said standard or post 5 when the beam is in a horizontal position or at the poising-point. The fixed indicating-point 10, which is also in the shape of an arrow-head, consists of a boss or enlargement formed integral with the post of standard, as clearly illustrated in Fig. 2 of the drawings.

A scale-pan 11 is connected at one end of the beam, which is provided at its other end with a graduated scale 12 and a movable weight 13. The scale-pan is connected with its arm of the beam by means of upwardly-converging supporting-rods 14, suitably secured at their lower ends to the scale-pan and connected at their upper ends with a head 15, which is pivoted in a slot or bifurcation 16 of the beam by means of a pivot 17 or other suitable device. Any form of pivot 17 may be employed, and in order to enable letters to be easily and quickly placed on the scale the scale-pan is provided at the front with a clamp 18, consisting of a radially-arranged spring, secured at its inner or rear end by rivets 19 or other suitable fastening devices to the lower face of the scale-pan and having its outer portion curved, as shown, and projecting slightly beyond the front edge of the scale-pan to facilitate the introduction of a letter between the clamp and the lower face of the scale-pan. Small packages may be placed in the scale-pan or hung on the clamp, or any other suitable means may be provided for facilitating the placing of packages on the scale.

The graduated scale 12, which is substantially quadrant-shaped, is curved, as shown, and is connected with the scale-beam by upper and lower arms 20 and 21, and the weight 13 is provided with a rod or arm 22, which is pivoted by a bolt 23 or other suitable fastening device to the scale-beam at the center of the circle of which the quadrant-shaped or arcuate scale 12 forms a part. The bolt is adapted to be tightened to produce the desired frictional contact between the arm of the weight 13 and the graduated scale, so that the weight will be retained in its adjusted position at any point along the graduated scale. As the weight is moved upward or outward its effect on the scale-beam is increased, and as it is swung downward or inward its effect on the scale-beam is reduced, as will be readily understood.

Having thus fully described my invention, what I claim as new, and desire to secure by Letters Patent, is—

1. A scale having a horizontal scale-pan, and provided with a letter-holding clamp, consisting of a radially-arranged spring secured at its inner end to the lower face of the scale-pan, and having its outer end extended beyond the periphery of the scale-pan.

2. A scale of the class described, comprising a support, a scale-beam pivotally mounted on the support and provided at one of its arms with a depending graduated scale, and a depending weight pivotally connected at the top with the scale-beam and arranged to move upwardly over the graduated scale.

3. A scale of the class described comprising a scale-beam provided at one of its arms with a graduated arcuate scale, and a depending weight provided with a supporting-rod, pivoted at its upper end to the beam and suspending the weight therefrom, said weight being movable over the graduated scale and having means for retaining it in its adjustment.

4. A scale comprising a support provided with a slot, having bearings at opposite sides thereof, said support being also provided below the bearings with a downwardly-extending fixed indicator, a scale-beam extending through the slot of the support and mounted in the bearings thereof, an upwardly-extending movable indicator located beneath and coöperating with the fixed indicator, said movable indicator being provided with upwardly-extending supporting-arms connected with the scale-beam.

In testimony that I claim the foregoing as my own I have hereto affixed my signature in the presence of two witnesses.

THOMAS J. KING.

Witnesses:
E. I. TREAT,
C. W. WINN.